(12) United States Patent
Morita et al.

(10) Patent No.: US 11,492,916 B2
(45) Date of Patent: Nov. 8, 2022

(54) TURBINE

(71) Applicant: IHI Corporation, Tokyo (JP)

(72) Inventors: Isao Morita, Tokyo (JP); Wataru Sato, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/404,490

(22) Filed: Aug. 17, 2021

(65) Prior Publication Data

US 2021/0372318 A1 Dec. 2, 2021

Related U.S. Application Data

(63) Continuation of application No. PCT/JP2019/034397, filed on Sep. 2, 2019.

(30) Foreign Application Priority Data

Mar. 6, 2019 (JP) .............................. JP2019-040384

(51) Int. Cl.
*F01D 9/02* (2006.01)
*F02B 37/18* (2006.01)
*F02B 37/02* (2006.01)

(52) U.S. Cl.
CPC ............ *F01D 9/026* (2013.01); *F02B 37/025* (2013.01); *F02B 37/18* (2013.01)

(58) Field of Classification Search
CPC ......... F02B 37/025; F02B 37/18; F01D 9/026
See application file for complete search history.

(56) References Cited

U.S. PATENT DOCUMENTS

| 4,611,465 | A | * | 9/1986 | Kato | ....................... | F02B 37/02 |
| | | | | | | 60/602 |
| 5,046,317 | A | * | 9/1991 | Satokawa | ............. | F02B 37/183 |
| | | | | | | 415/151 |
| 8,336,309 | B2 | * | 12/2012 | McEwan | ................. | F02B 37/18 |
| | | | | | | 60/602 |
| 2007/0180826 | A1 | * | 8/2007 | Sumser | ................... | F02B 37/22 |
| | | | | | | 60/599 |

(Continued)

FOREIGN PATENT DOCUMENTS

| DE | 102017202211 A1 * | 8/2018 | ............. F01D 9/026 |
| JP | 57-137619 A | 8/1982 | |

(Continued)

OTHER PUBLICATIONS

International Search Report dated Nov. 5, 2019 in PCT/JP2019/034397, filed on Sep. 2, 2019, 2 pages.

*Primary Examiner* — Ngoc T Nguyen
(74) *Attorney, Agent, or Firm* — Oblon, McClelland, Maier & Neustadt, L.L.P.

(57) ABSTRACT

A turbine includes: an inner diameter side exhaust flow path; an outer diameter side exhaust flow path having a flow path cross-sectional area smaller than a flow path cross-sectional area of the inner diameter side exhaust flow path; an inner diameter side bypass flow path connecting the inner diameter side exhaust flow path and a discharge flow path; and an outer diameter side bypass flow path connecting the outer diameter side exhaust flow path and the discharge flow path, the outer diameter side bypass flow path having a flow path cross-sectional area larger than a flow path cross-sectional area of the inner diameter side bypass flow path.

8 Claims, 7 Drawing Sheets

(56) References Cited

U.S. PATENT DOCUMENTS

| | | | |
|---|---|---|---|
| 2010/0229550 A1* | 9/2010 | Kuspert | F02B 37/12 |
| | | | 60/602 |
| 2013/0121820 A1 | 5/2013 | Yoshida et al. | |
| 2014/0219786 A1* | 8/2014 | Zhu | F02B 37/225 |
| | | | 415/151 |
| 2016/0230585 A1* | 8/2016 | Arnold | F02B 37/025 |
| 2017/0159551 A1* | 6/2017 | Chu | F02B 37/025 |
| 2018/0238226 A1 | 8/2018 | Wang et al. | |
| 2019/0048789 A1 | 2/2019 | Yoshida et al. | |
| 2022/0003151 A1* | 1/2022 | Okamoto | F02B 37/18 |

FOREIGN PATENT DOCUMENTS

| | | |
|---|---|---|
| JP | 59-203821 A | 11/1984 |
| JP | 61-151040 U | 9/1986 |
| JP | 61-178034 U | 11/1986 |
| JP | 62-279233 A | 12/1987 |
| JP | 1-96428 A | 4/1989 |
| JP | 6-5022 B2 | 1/1994 |
| JP | 2006-348894 A | 12/2006 |
| JP | 2009-287434 A | 12/2009 |
| JP | 2012-97699 A | 5/2012 |
| JP | 2012-219640 A | 11/2012 |
| JP | 2017-180286 A | 10/2017 |
| JP | 2018-172989 A | 11/2018 |
| WO | WO-2018151267 A1 * 8/2018 | ........... F01D 17/146 |

* cited by examiner

TURBINE

CROSS REFERENCE TO RELATED APPLICATIONS

This application is a continuation application of International Application No. PCT/JP2019/034397, filed on Sep. 2, 2019, which claims priority to Japanese Patent Application No. 2019-040384, filed on Mar. 6, 2019, the entire contents of which are incorporated by reference herein.

BACKGROUND ART

Technical Field

The present disclosure relates to a turbine.

Related Art

Turbochargers include a turbine. In a turbine of Patent Literature 1, two exhaust flow paths are formed. The two exhaust flow paths are arranged side by side in the radial direction of a turbine impeller. The two exhaust flow paths communicate with an accommodation unit accommodating the turbine impeller at different positions in the circumferential direction of the turbine impeller.

CITATION LIST

Patent Literature

Patent Literature 1: JP 2017-180286 A

SUMMARY

Technical Problem

The two exhaust flow paths are usually provided with two bypass flow paths. The two bypass flow paths have substantially the same flow path cross-sectional area. There are cases where the two exhaust flow paths have different flow path cross-sectional areas due to layout restrictions. In a case where the flow path cross-sectional areas of the two exhaust flow paths are different from each other, the engine back pressure fluctuates when the gas is exhausted while the two bypass flow paths are open.

An object of the present disclosure is to provide a turbine capable of reducing fluctuations in the engine back pressure.

Solution to Problem

In order to solve the above disadvantages, a turbine of the present disclosure includes: a housing in which an accommodation unit for accommodating a turbine impeller is formed; a first exhaust flow path formed in the housing and communicating with the accommodation unit; a second exhaust flow path formed in the housing and communicating with the accommodation unit at a position different, in a circumferential direction of the turbine impeller, from a position where the accommodation unit and the first exhaust flow path communicate, the second exhaust flow path having a flow path cross-sectional area smaller than a flow path cross-sectional area of the first exhaust flow path; a discharge flow path formed in the housing and communicating with the accommodation unit in an axial direction of the turbine impeller; a first bypass flow path connecting the first exhaust flow path and the discharge flow path; and a second bypass flow path connecting the second exhaust flow path and the discharge flow path, the second bypass flow path having a flow path cross-sectional area larger than a flow path cross-sectional area of the first bypass flow path.

The second exhaust flow path may have a longer length than a length of the first exhaust flow path.

The first exhaust flow path may have a longer length than a length of the second exhaust flow path.

Further included are: a first tongue partitioning the first exhaust flow path and the second exhaust flow path, the first tongue included at a position facing a downstream end of the first exhaust flow path in the housing; and a second tongue partitioning the second exhaust flow path and the first exhaust flow path, the second tongue included at a position facing a downstream end of the second exhaust flow path in the housing, in which the flow path cross-sectional area of the first exhaust flow path is a first exhaust minimum area in which the flow path cross-sectional area is the smallest in a portion of the first exhaust flow path facing the second tongue, the flow path cross-sectional area of the second exhaust flow path is a second exhaust minimum area in which the flow path cross-sectional area is the smallest in a portion of the second exhaust flow path facing the first tongue, the flow path cross-sectional area of the first bypass flow path is a first bypass minimum area in which the flow path cross-sectional area is the smallest in the first bypass flow path, the flow path cross-sectional area of the second bypass flow path is a second bypass minimum area in which the flow path cross-sectional area is the smallest in of the second bypass flow path, and as compared with a difference between a first effective area, which is derived from the first exhaust minimum area and a throat area of the turbine impeller, and a second effective area, which is derived from the second exhaust minimum area and a throat area of the turbine impeller, a difference between a sum of the first effective area and the first bypass minimum area and a sum of the second effective area and the second bypass minimum area may be smaller.

Where the first exhaust minimum area is denoted by $A_a$, the second exhaust minimum area is denoted by $A_b$, a total throat area of the turbine impeller is denoted by $A_i$, a throat area of a facing portion of the turbine impeller facing the first exhaust flow path is denoted by $A_{ia}$, a throat area of a facing portion of the turbine impeller facing the second exhaust flow path is denoted by $A_{ib}$, a central angle of the facing portion of the turbine impeller facing the first exhaust flow path is denoted by $\theta_a$, a central angle of the facing portion of the turbine impeller facing the second exhaust flow path is denoted by $\theta_b$, the first effective area is denoted by $A_{af}$, and the second effective area is denoted by $A_{bf}$, the first effective area $A_{af}$ may be derived from Equation (1) and Equation (1a), and the second effective area $A_{bf}$ may be derived from Equation (2) and Equation (2a).

[Math. 1]

$$A_{af} = \frac{A_a \cdot A_{ia}}{\sqrt{A_a^2 + A_{ia}^2}} \quad (1)$$

[Math. 2]

$$A_{ia} = A_i \cdot \frac{\theta_a}{\theta_a + \theta_b} \quad (1a)$$

-continued

[Math. 3]

$$A_{bf} = \frac{A_b \cdot A_{ib}}{\sqrt{A_b^2 + A_{ib}^2}} \quad (2)$$

[Math. 4]

$$A_{ib} = A_i \cdot \frac{\theta_b}{\theta_a + \theta_b} \quad (2a)$$

Effects of Disclosure

According to the present disclosure, it is possible to reduce fluctuations in the engine back pressure.

DESCRIPTION OF EMBODIMENTS

An embodiment of the present disclosure will be described below by referring to the accompanying drawings. Dimensions, materials, other specific numerical values, and the like illustrated in embodiments are merely examples for facilitating understanding, and the present disclosure is not limited thereby unless otherwise specified. Note that, in the present specification and the drawings, components having substantially the same function and structure are denoted by the same symbol, and redundant explanations are omitted. Components not directly related to the present disclosure are not illustrated.

Figure 1:
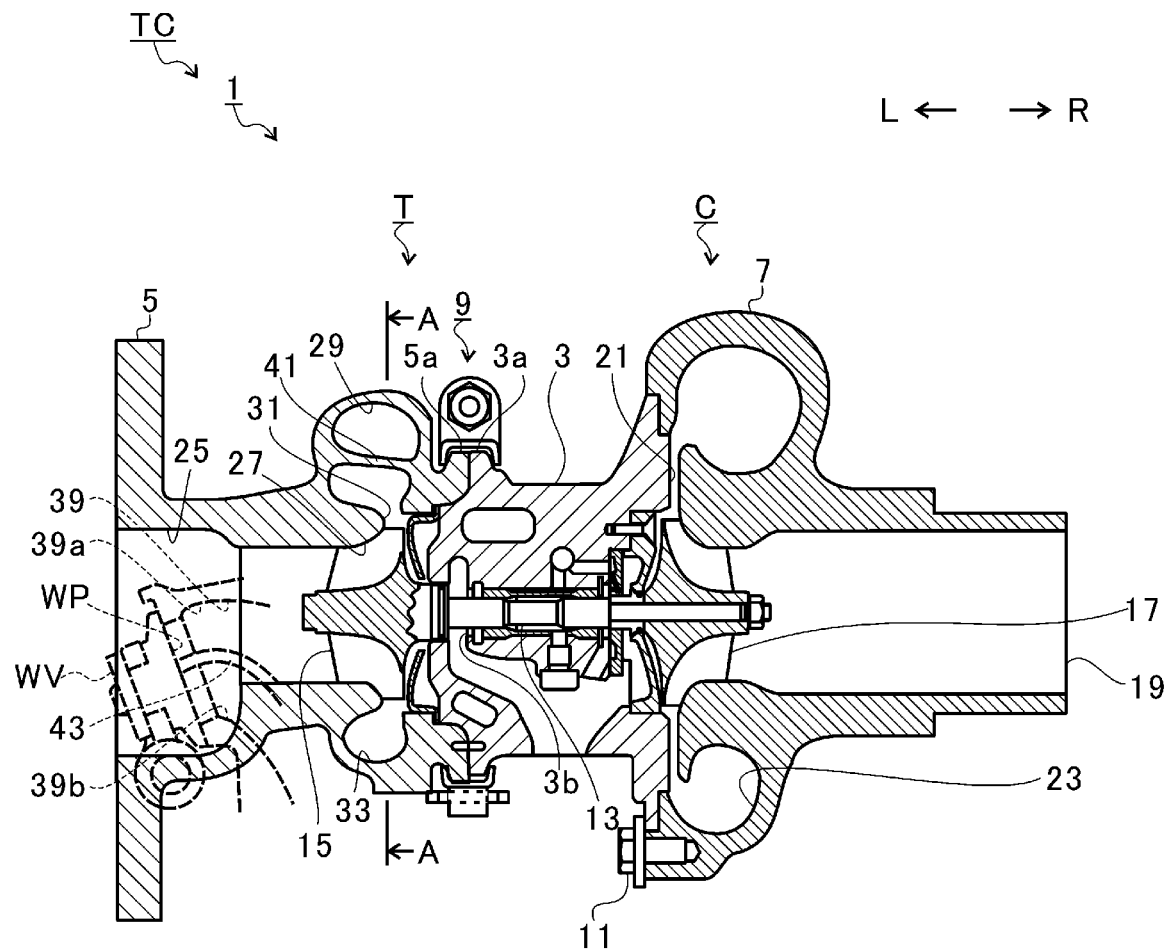
FIG. 1 is a schematic cross-sectional view of a turbocharger.

FIG. 1 is a schematic cross-sectional view of a turbocharger TC. Description is given assuming that a direction of arrow L illustrated in FIG. 1 is the left side of the turbocharger TC. Description is given assuming that a direction of arrow R illustrated in FIG. 1 is the right side of the turbocharger TC. As illustrated in FIG. 1, the turbocharger TC includes a turbocharger main body 1. The turbocharger main body 1 includes a bearing housing 3, a turbine housing (housing) 5, and a compressor housing 7. The turbine housing 5 is coupled to the left side of the bearing housing 3 by a fastening mechanism 9. The compressor housing 7 is coupled to the right side of the bearing housing 3 by a fastening bolt 11. A turbine T includes the bearing housing 3 and the turbine housing 5. A centrifugal compressor C includes the bearing housing 3 and the compressor housing 7.

A protrusion 3a is formed on the outer curved surface of the bearing housing 3. The protrusion 3a is formed closer to the turbine housing 5. The protrusion 3a protrudes in a radial direction of the bearing housing 3. A protrusion 5a is formed on the outer curved surface of the turbine housing 5. The protrusion 5a is formed closer to the bearing housing 3. The protrusion 5a protrudes in a radial direction of the turbine housing 5. The bearing housing 3 and the turbine housing 5 are band-fastened to each other by the fastening mechanism 9. The fastening mechanism 9 includes, for example, a G coupling. The fastening mechanism 9 clamps the protrusions 3a and 5a.

A bearing hole 3b is formed in the bearing housing 3. The bearing hole 3b penetrates through the turbocharger TC in the left-right direction. The bearing hole 3b pivotally supports a shaft 13 via a sliding bearing in a freely rotatable manner. At the left end of the shaft 13, a turbine impeller 15 is provided. The turbine impeller 15 is arranged in the turbine housing 5. The turbine impeller 15 is accommodated in the turbine housing 5 in a freely rotatable manner. A compressor impeller 17 is provided at the right end of the shaft 13. The compressor impeller 17 is arranged in the compressor housing 7. The compressor impeller 17 is accommodated in the compressor housing 7 in a freely rotatable manner.

An intake port 19 is formed in the compressor housing 7. The intake port 19 opens to the right side of the turbocharger TC. The intake port 19 is connected to an air cleaner (not illustrated). Facing surfaces of the bearing housing 3 and the compressor housing 7 form a diffuser flow path 21. The diffuser flow path 21 pressurizes the air. The diffuser flow path 21 is formed in an annular shape. The diffuser flow path 21 communicates with the intake port 19 via the compressor impeller 17 on an inner side in the radial direction of the shaft 13.

A compressor scroll flow path 23 is formed in the compressor housing 7. The compressor scroll flow path 23 is formed in an annular shape. The compressor scroll flow path 23 is positioned on an outer side in the radial direction of the shaft 13 with respect to the diffuser flow path 21. The compressor scroll flow path 23 communicates with an intake port of an engine (not illustrated) and the diffuser flow path 21. When the compressor impeller 17 rotates, the air is sucked from the intake port 19 into the compressor housing 7. The sucked air is pressurized and accelerated in the process of flowing between the blades of the compressor impeller 17. The pressurized and accelerated air is further pressurized by the diffuser flow path 21 and the compressor scroll flow path 23. The pressurized air is guided to the intake port of the engine.

In the turbine housing 5, a discharge flow path 25, an accommodation unit 27, and an exhaust flow path 29 are formed. The discharge flow path 25 opens to the left side of the turbocharger TC. The discharge flow path 25 is connected to an exhaust gas purification device (not illustrated). The discharge flow path 25 communicates with the accommodation unit 27. The discharge flow path 25 is continuous with the accommodation unit 27 in the rotation axis direction of the turbine impeller 15. The accommodation unit 27 accommodates the turbine impeller 15. The exhaust flow path 29 is arranged on an outer side in the radial direction of the accommodation unit 27 (turbine impeller 15). The exhaust flow path 29 communicates with the accommodation unit 27. The exhaust flow path 29 is continuous with the accommodation unit 27 in the radial direction of the turbine impeller 15.

Figure 2:
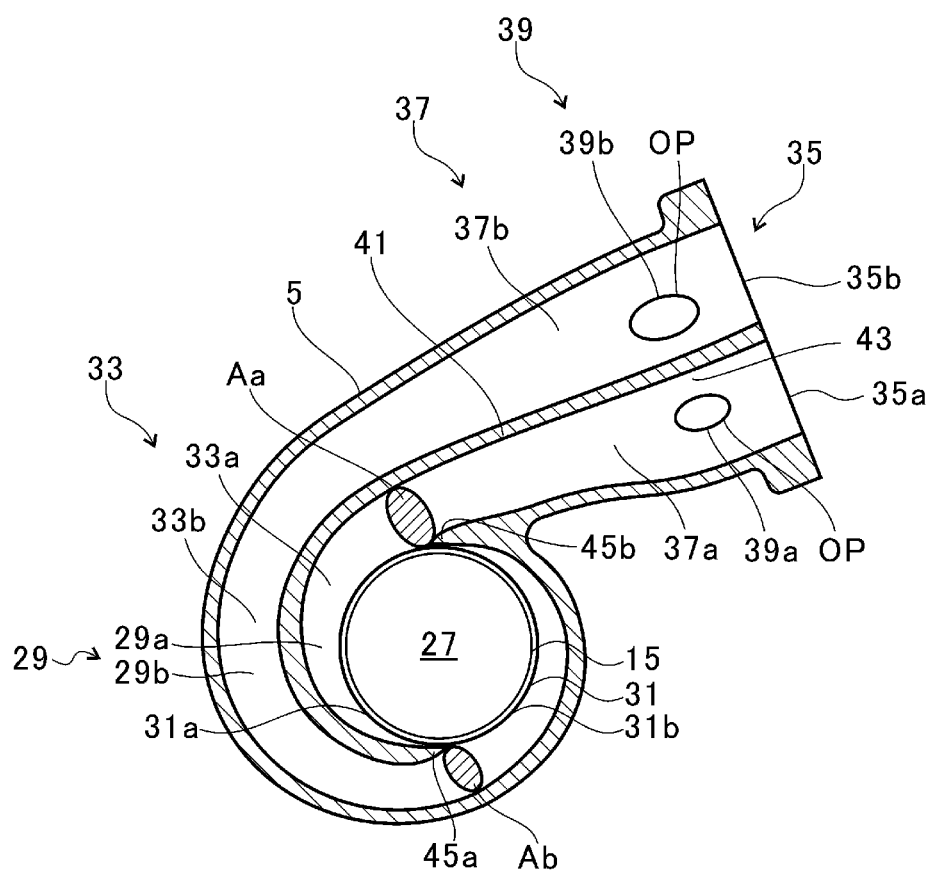
FIG. 2 is a cross-sectional view taken along line AA of the turbine housing illustrated in FIG. 1.

FIG. 2 is a cross-sectional view taken along line AA of the turbine housing 5 illustrated in FIG. 1. In FIG. 2, as for the turbine impeller 15, only the outer circumference is illustrated as a circle. As illustrated in FIG. 2, the exhaust flow path 29 is formed on the outer side in the radial direction of the accommodation unit 27 (turbine impeller 15). The exhaust flow path 29 includes a communicating unit 31, a turbine scroll flow path 33, an exhaust introduction port 35, and an exhaust introduction path 37.

The communicating unit 31 is formed in an annular shape over the entire circumference of the accommodation unit 27. The turbine scroll flow path 33 is positioned, for example, on an outer side in the radial direction of the turbine impeller 15 with respect to the communicating unit 31. The turbine scroll flow path 33 is formed in an annular shape over the entire circumference of the communicating unit 31 (accommodation unit 27). The communicating unit 31 communicates the accommodation unit 27 with the turbine scroll flow path 33.

The exhaust introduction port 35 opens to the outside of the turbine housing 5. Exhaust gas discharged from an exhaust manifold of the engine (not illustrated) is introduced to the exhaust introduction port 35. The exhaust introduction path 37 is formed between the exhaust introduction port 35 and the turbine scroll flow path 33. The exhaust introduction path 37 connects the exhaust introduction port 35 and the turbine scroll flow path 33. The exhaust introduction path 37 is formed, for example, in a straight line shape. The exhaust introduction path 37 guides the exhaust gas introduced from the exhaust introduction port 35 to the turbine scroll flow path 33. The turbine scroll flow path 33 guides the exhaust gas introduced from the exhaust introduction path 37 to the accommodation unit 27 via the communicating unit 31. As described above, the exhaust flow path 29 includes the exhaust introduction port 35, the exhaust introduction path 37, the turbine scroll flow path 33, and the communicating unit 31. The exhaust flow path 29 extends from the exhaust introduction port 35 to the communicating unit 31.

A bypass flow path 39 is formed in the turbine housing 5. In the bypass flow path 39, an inlet end OP opens in the exhaust flow path 29, and an outlet end (wastegate port WP described later) opens in the discharge flow path 25 (see FIG. 1). More specifically, in the bypass flow path 39, the inlet end OP opens in the exhaust introduction path 37, and the outlet end opens in the discharge flow path 25. The bypass flow path 39 communicates (connects) the exhaust introduction path 37 and the discharge flow path 25.

The wastegate port WP (see FIG. 1) is formed at the outlet end of the bypass flow path 39. A wastegate valve WV (see FIG. 1) capable of opening and closing the wastegate port WP is arranged at the outlet end of the bypass flow path 39. The wastegate valve WV is arranged in the discharge flow path 25. When the wastegate valve WV opens the wastegate port WP, the bypass flow path 39 allows a part of the exhaust gas flowing through the exhaust introduction path 37 to bypass the accommodation unit 27 (turbine impeller 15) and to leak into the discharge flow path 25.

In the turbine housing 5, a partition plate 41 is formed. The partition plate 41 is arranged in the exhaust flow path 29. More specifically, the partition plate 41 is arranged in the exhaust introduction port 35, the exhaust introduction path 37, and the turbine scroll flow path 33. The partition plate 41 is connected to the inner surfaces of the exhaust introduction port 35, the exhaust introduction path 37, and the turbine scroll flow path 33 in the rotation axis direction of the turbine impeller 15 (hereinafter, also referred to as the lateral direction of the partition plate 41). The partition plate 41 extends in a direction away from the exhaust introduction port 35. The partition plate 41 extends along the exhaust flow path 29. That is, the partition plate 41 extends along the exhaust flow direction in which the exhaust gas flows (hereinafter, also referred to as the longitudinal direction of the partition plate 41). Hereinafter, the upstream side in the exhaust flow direction is simply referred to as an upstream side, and the downstream side in the exhaust flow direction is simply referred to as a downstream side. The upstream end of the partition plate 41 is arranged at the exhaust introduction port 35, and the downstream end is arranged at a position (boundary) between the turbine scroll flow path 33 and the communicating unit 31.

The partition plate 41 partitions (divides) the exhaust flow path 29 in the radial direction (hereinafter, simply referred to as the radial direction) of the turbine impeller 15. The exhaust flow path 29 is divided into an inner diameter side exhaust flow path (first exhaust flow path) 29a and an outer diameter side exhaust flow path (second exhaust flow path) 29b by the partition plate 41. The inner diameter side exhaust flow path 29a is located on the inner side in the radial direction of the turbine impeller 15 with respect to the outer diameter side exhaust flow path 29b. The inner diameter side exhaust flow path 29a is formed side by side with the outer diameter side exhaust flow path 29b in the radial direction. The outer diameter side exhaust flow path 29b has a longer length than that of the inner diameter side exhaust flow path 29a.

The partition plate 41 divides the exhaust introduction port 35 in the radial direction. The exhaust introduction port 35 is divided into an inner diameter side exhaust introduction port 35a and an outer diameter side exhaust introduction port 35b by the partition plate 41. The inner diameter side exhaust introduction port 35a is located on the inner side in the radial direction of the turbine impeller 15 with respect to the outer diameter side exhaust introduction port 35b. The inner diameter side exhaust introduction port 35a is formed side by side with the outer diameter side exhaust introduction port 35b in the radial direction.

Here, the exhaust manifold (not illustrated) includes two (a plurality of) divided paths. The two divided paths are each connected to one of the inner diameter side exhaust introduction port 35a and the outer diameter side exhaust introduction port 35b. Exhaust gas discharged from an engine (not illustrated) flows through the two divided paths of the exhaust manifold and is introduced into the inner diameter side exhaust introduction port 35a and the outer diameter side exhaust introduction port 35b. Of the exhaust gas flowing through the two divided paths, one portion is introduced into the inner diameter side exhaust introduction port 35a, and the other portion is introduced into the outer diameter side exhaust introduction port 35b.

The partition plate 41 divides the exhaust introduction path 37 in the radial direction. The exhaust introduction path 37 is divided into an inner diameter side exhaust introduction path 37a and an outer diameter side exhaust introduction path 37b by the partition plate 41. The inner diameter side exhaust introduction path 37a is located on the inner side in the radial direction of the turbine impeller 15 with respect to the outer diameter side exhaust introduction path 37b. The inner diameter side exhaust introduction path 37a is formed side by side with the outer diameter side exhaust introduction path 37b in the radial direction of the turbine impeller 15. The inner diameter side exhaust introduction path 37a communicates with the inner diameter side exhaust introduction port 35a. The outer diameter side exhaust introduction path 37b communicates with the outer diameter side exhaust introduction port 35b.

Figure 3:
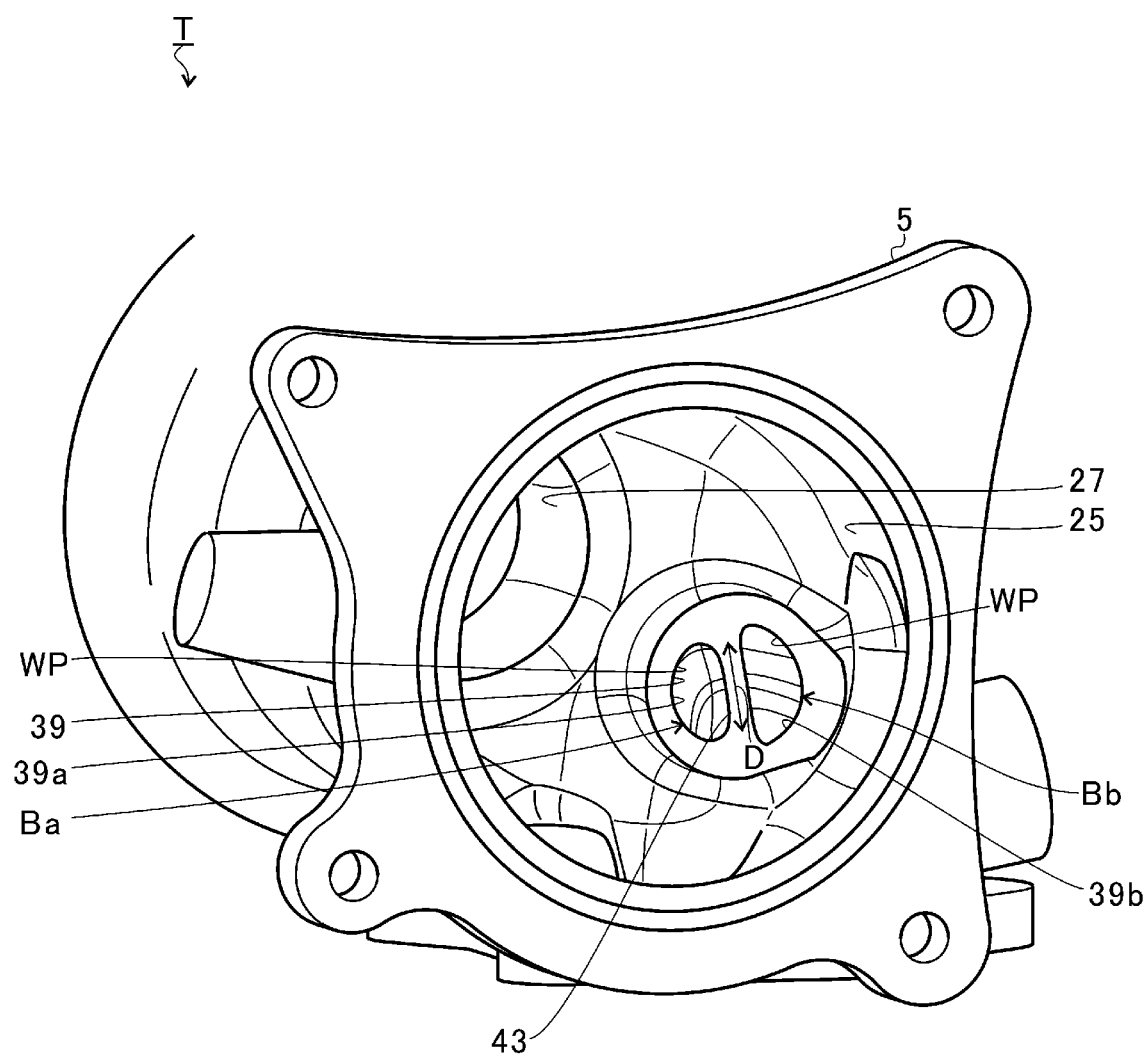
FIG. 3 is a schematic perspective view of the turbine housing as viewed from a wastegate port side.

FIG. 3 is a schematic perspective view of the turbine housing 5 as viewed from the wastegate port WP side. In FIG. 3, the wastegate valve WV is not illustrated. As illustrated in FIG. 3, a partition wall 43 is formed in the bypass flow path 39. One end of the partition wall 43 is located at the inlet end OP (see FIG. 2) of the bypass flow path 39, and the other end is located at the outlet end (wastegate port WP) of the bypass flow path 39.

The partition wall 43 extends along the exhaust flow direction (hereinafter, also referred to as the longitudinal direction of the partition wall 43) in which the exhaust gas flows through the bypass flow path 39. The partition wall 43 is connected to the inner surface of the bypass flow path 39 in a lateral direction D orthogonal to the longitudinal direction of the partition wall 43. The partition wall 43 divides the bypass flow path 39. The bypass flow path 39 is divided into an inner diameter side bypass flow path (first bypass flow path) 39a and an outer diameter side bypass flow path (second bypass flow path) 39b by the partition wall 43.

Referring back to FIG. 2, the inner diameter side bypass flow path 39a communicates with the inner diameter side exhaust introduction path 37a. The inner diameter side bypass flow path 39a connects the inner diameter side exhaust introduction path 37a and the discharge flow path 25 (see FIGS. 1 and 3). The inner diameter side bypass flow path 39a guides a part of the exhaust gas flowing through the inner diameter side exhaust introduction path 37a to the wastegate port WP (see FIGS. 1 and 3). The outer diameter side bypass flow path 39b communicates with the outer diameter side exhaust introduction path 37b. The outer diameter side bypass flow path 39b connects the outer diameter side exhaust introduction path 37b and the discharge flow path 25. The outer diameter side bypass flow path 39b guides a part of the exhaust gas flowing through the outer diameter side bypass flow path 39b to the wastegate port WP.

The partition plate 41 divides the turbine scroll flow path 33 in the radial direction. The turbine scroll flow path 33 is divided into an inner diameter side turbine scroll flow path 33a and an outer diameter side turbine scroll flow path 33b by the partition plate 41. The inner diameter side turbine scroll flow path 33a is located on the inner side in the radial direction with respect to the outer diameter side turbine scroll flow path 33b. The inner diameter side turbine scroll flow path 33a is formed side by side with the outer diameter side turbine scroll flow path 33b in the radial direction. The inner diameter side turbine scroll flow path 33a communicates with the inner diameter side exhaust introduction path 37a. The outer diameter side turbine scroll flow path 33b communicates with the outer diameter side exhaust introduction path 37b.

The radial width of the inner diameter side turbine scroll flow path 33a decreases as it extends away from the inner diameter side exhaust introduction path 37a. That is, the radial width of the inner diameter side turbine scroll flow path 33a decreases as it extends from the upstream side to the downstream side.

The radial width of the outer diameter side turbine scroll flow path 33b decreases as it extends away from the outer diameter side exhaust introduction path 37b. That is, the radial width of the outer diameter side turbine scroll flow path 33b decreases as it extends from the upstream side to the downstream side.

The communicating unit 31 communicates with the inner diameter side turbine scroll flow path 33a in the left half circumference in FIG. 2. Hereinafter, the portion of the communicating unit 31 that communicates with the inner diameter side turbine scroll flow path 33a is referred to as a first communicating unit 31a. The communicating unit 31 communicates with the outer diameter side turbine scroll flow path 33b in the right half circumference in FIG. 2. Hereinafter, the portion of the communicating unit 31 that communicates with the outer diameter side turbine scroll flow path 33b is referred to as a second communicating unit 31b.

The accommodation unit 27 communicates with the first communicating unit 31a in the left half circumference in FIG. 2. The first communicating unit 31a is located between the inner diameter side turbine scroll flow path 33a and the accommodation unit 27. The accommodation unit 27 communicates with the second communicating unit 31b in the right half circumference in FIG. 2. The second communicating unit 31b is located between the outer diameter side turbine scroll flow path 33b and the accommodation unit 27.

In this manner, the accommodation unit 27 communicates with the inner diameter side exhaust flow path 29a on the left half circumference in FIG. 2. The accommodation unit 27 communicates with the outer diameter side exhaust flow path 29b in the right half circumference in FIG. 2. The position of the accommodation unit 27 communicating with the inner diameter side exhaust flow path 29a is different from the position thereof communicating with the outer diameter side exhaust flow path 29b in the circumferential direction of the turbine impeller 15. In other words, the position where the accommodation unit 27 communicates with the inner diameter side turbine scroll flow path 33a via the first communicating unit 31a is different from the position where the accommodation unit 27 communicates with the outer diameter side turbine scroll flow path 33b via the second communicating unit 31b in the circumferential direction of the turbine impeller 15.

A first tongue 45a and a second tongue 45b are formed in the turbine housing 5. The first tongue 45a is formed at the downstream end of the partition plate 41 (that is, the end on the side separated from the exhaust introduction port 35). The first tongue 45a is provided at a position facing the downstream end of the inner diameter side turbine scroll flow path 33a. The first tongue 45a partitions the inner diameter side turbine scroll flow path 33a and the outer diameter side turbine scroll flow path 33b.

The second tongue 45b is provided at a position facing the downstream end of the outer diameter side turbine scroll flow path 33b. The second tongue 45b partitions the outer diameter side turbine scroll flow path 33b and the inner diameter side turbine scroll flow path 33a.

The phase of the first tongue 45a is approximately 180 degrees shifted from that of the second tongue 45b in the rotation direction of the turbine impeller 15. That is, the first tongue 45a and the second tongue 45b are arranged at equal intervals in the rotation direction of the turbine impeller 15. Note that it is only required that the phase (position) of the first tongue 45a be shifted from that of the second tongue 45b in the rotation direction of the turbine impeller 15. The phase shift of the first tongue 45a with respect to the second tongue 45b may not be approximately 180 degrees. That is, the first tongue 45a and the second tongue 45b may be arranged at irregular intervals in the rotation direction of the turbine impeller 15. The first tongue 45a and the second tongue 45b face the turbine impeller 15 in the radial direction.

Returning to FIG. 1, the exhaust gas discharged from the exhaust manifold of the engine (not illustrated) is guided to the discharge flow path 25 via the exhaust flow path 29 and the accommodation unit 27. The exhaust gas guided to the discharge flow path 25 rotates the turbine impeller 15 in the process of flowing therethrough.

The turning force of the turbine impeller 15 is transmitted to the compressor impeller 17 via the shaft 13. When the compressor impeller 17 rotates, the air is pressurized as described above. In this manner, the air is guided to the intake port of the engine.

Meanwhile, there are cases where the inner diameter side exhaust flow path 29a and the outer diameter side exhaust flow path 29b may have different flow path cross-sectional areas due to layout restrictions. In the present embodiment, as illustrated in FIG. 2, the flow path cross-sectional areas of the inner diameter side exhaust flow path 29a and the outer diameter side exhaust flow path 29b are different from each other when compared at positions where the distances from the respective ends (tongues) of the inner diameter side turbine scroll flow path 33a and the outer diameter side turbine scroll flow path 33b are the same. The flow path cross-sectional area of the inner diameter side exhaust flow path 29a is larger than the flow path cross-sectional area of the outer diameter side exhaust flow path 29b when compared at positions where the distances from the respective ends (tongues) of the inner diameter side turbine scroll flow path 33a and the outer diameter side turbine scroll flow path 33b are the same. For example, the smallest flow path cross-sectional area in the portion of the inner diameter side exhaust flow path (first exhaust flow path) 29a facing the second tongue 45b is defined as a first exhaust minimum area Aa. The smallest flow path cross-sectional area of the outer diameter side exhaust flow path (second exhaust flow path) 29b in the portion facing the first tongue 45a is defined as a second exhaust minimum area Ab. In this case, the first exhaust minimum area Aa is larger than the second exhaust minimum area Ab. In other words, the second exhaust minimum area Ab is smaller than the first exhaust minimum area Aa.

Note that, in the present embodiment, an example in which the first exhaust minimum area Aa has a size different from that of the second exhaust minimum area Ab will be described; however, the present disclosure is not limited thereto. For example, the position of a cross section where the flow path cross-sectional area is the smallest (first exhaust minimum area Aa) in the portion of the inner diameter side exhaust flow path 29a facing the second tongue 45b is defined as a first cross-sectional position. The position of a cross section where the flow path cross-sectional area is the smallest (second exhaust minimum area Ab) in the portion of the outer diameter side exhaust flow path 29b facing the first tongue 45a is defined as a second cross-sectional position. In this case, at cross-sectional positions shifted from the first cross-sectional position and the second cross-sectional position, being as references, closer to the communicating unit 31 (or closer to the exhaust introduction port 35) by a predetermined distance, the flow path cross-sectional areas of the inner diameter side exhaust flow path 29a and the outer diameter side exhaust flow path 29b may be different from each other.

Figure 4:
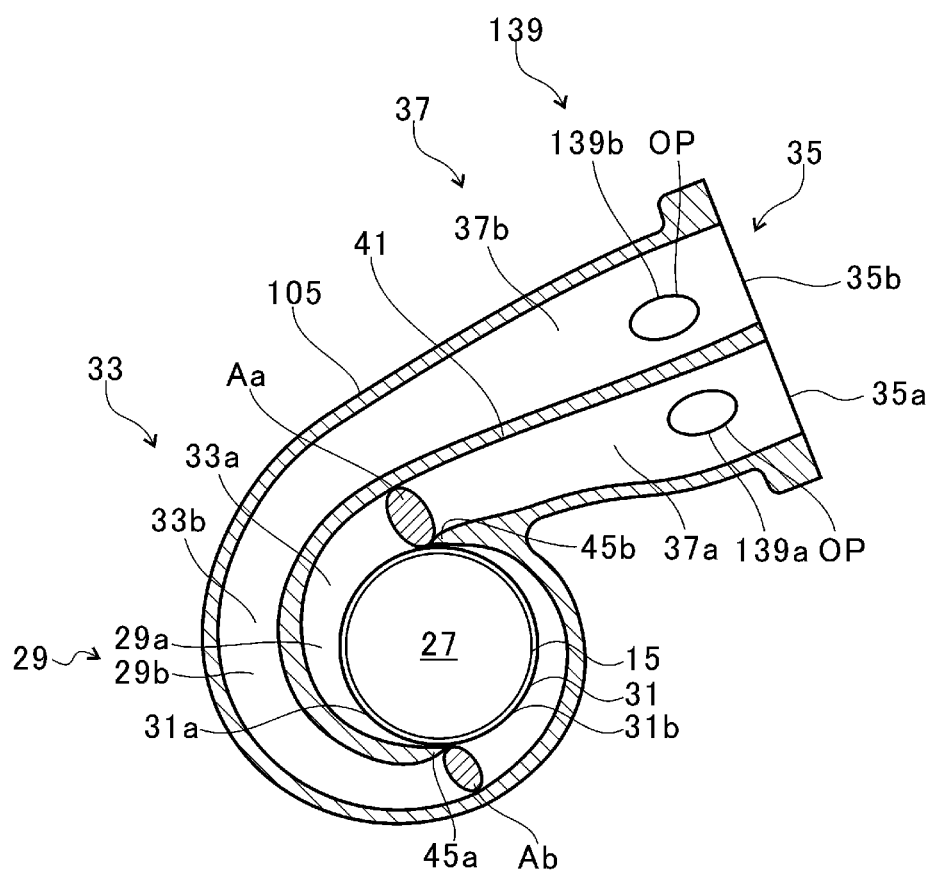
FIG. 4 is a cross-sectional view taken along line AA of a turbine housing in a comparative example.

FIG. 4 is a cross-sectional view taken along line AA of a turbine housing 105 in a comparative example. As illustrated in FIG. 4, the turbine housing 105 includes a bypass flow path 139. The turbine housing 105 in the comparative example has the same structure as the turbine housing 5 of the present embodiment except for the bypass flow path 139. The bypass flow path 139 includes an inner diameter side bypass flow path 139a and an outer diameter side bypass flow path 139b. The flow path cross-sectional areas of the inner diameter side bypass flow path 139a and the outer diameter side bypass flow path 139b are substantially the same. The turbine housing 105 has a first exhaust minimum area Aa and a second exhaust minimum area Ab that are different from each other.

Here, when the wastegate valve WV (see FIG. 1) is closed, exhaust gas flows through the exhaust flow path 29 without flowing through the bypass flow path 139. At this point, the exhaust gas flows through the exhaust flow path 29 at a flow rate corresponding to the flow path cross-sectional area of the inner diameter side exhaust flow path 29a and the outer diameter side exhaust flow path 29b. Therefore, there is a flow rate difference between the flow rate of the exhaust gas flowing through the inner diameter side exhaust flow path 29a (hereinafter, also simply referred to as the inner diameter side flow rate) and the flow rate of the exhaust gas flowing through the outer diameter side exhaust flow path 29b (hereinafter, simply referred to as the outer diameter side flow rate).

On the other hand, when the wastegate valve WV (see FIG. 1) is open, the exhaust gas flows through the exhaust flow path 29 and the bypass flow path 139. In this case, the exhaust gas flows through the exhaust flow path 29 and the bypass flow path 139 at flow rates corresponding to the flow path cross-sectional areas of the inner diameter side exhaust flow path 29a, the outer diameter side exhaust flow path 29b, the inner diameter side bypass flow path 139a, and the outer diameter side bypass flow path 139b. Here, the flow path cross-sectional areas of the inner diameter side bypass flow path 139a and the outer diameter side bypass flow path 139b are substantially the same.

Therefore, there is a flow rate difference between the flow rate of the exhaust gas flowing through the inner diameter side exhaust flow path 29a and the inner diameter side bypass flow path 139a (hereinafter, also simply referred to as the inner diameter side flow rate) and the flow rate of the exhaust gas flowing through the outer diameter side exhaust flow path 29b and the outer diameter side bypass flow path 139b (hereinafter, also simply referred to as the outer diameter side flow rate). The flow rate difference between the inner diameter side flow rate and the outer diameter side flow rate when the wastegate valve WV (see FIG. 1) is open is approximately the same as the flow rate difference between the inner diameter side flow rate and the outer diameter side flow rate when the wastegate valve WV is closed. That is, in the turbine housing 105 of the comparative example, it is difficult to reduce the flow rate difference between the inner diameter side flow rate and the outer diameter side flow rate when the wastegate valve WV is open. Therefore, in the turbine housing 105 of the comparative example, the engine back pressure may fluctuate when the wastegate valve WV is open, which may disadvantageously reduce the turbocharging performance of the turbocharger TC.

Therefore, as illustrated in FIG. 2, in the turbine housing 5 of the present embodiment, the flow path cross-sectional areas of the inner diameter side bypass flow path 39a and the outer diameter side bypass flow path 39b are different from each other. Specifically, the flow path cross-sectional areas of the inner diameter side bypass flow path 39a and the outer diameter side bypass flow path 39b are different from each other when compared at positions where the distances of the inner diameter side bypass flow path 39a and the outer diameter side bypass flow path 39b from the wastegate port WP are equal to each other. In the present embodiment, the flow path cross-sectional area of the inner diameter side bypass flow path 39a is smaller than the flow path cross-sectional area of the outer diameter side bypass flow path 39b when compared at the positions where the distances from the inner diameter side bypass flow path 39a and the outer diameter side bypass flow path 39b from the wastegate port WP are equal to each other. In other words, the flow path cross-sectional area of the outer diameter side bypass flow path 39b is larger than the flow path cross-sectional area of the inner diameter side bypass flow path 39a. More specifically, the opening area of the inlet end OP of the inner diameter side bypass flow path 39a is smaller than the opening area of the inlet end OP of the outer diameter side bypass flow path 39b.

As illustrated in FIG. 3, an inner diameter side bypass minimum area (first bypass minimum area) Ba, which is the smallest flow path cross-sectional area of the inner diameter side bypass flow path 39a, is smaller than an outer diameter side bypass minimum area (second bypass minimum area) Bb, which is the smallest flow path cross-sectional area of the outer diameter side bypass flow path 39b. The inner diameter side bypass minimum area Ba is, for example, the opening area of the wastegate port WP of the inner diameter side bypass flow path 39a. The outer diameter side bypass minimum area Bb is, for example, the opening area of the wastegate port WP of the outer diameter side bypass flow path 39b. That is, the opening area of the wastegate port WP of the inner diameter side bypass flow path 39a is smaller than the opening area of the wastegate port WP of the outer diameter side bypass flow path 39b.

As illustrated in FIG. 2, the flow path cross-sectional areas of the inner diameter side exhaust flow path 29a and the outer diameter side exhaust flow path 29b are different from each other. In the present embodiment, the flow path cross-sectional area of the inner diameter side exhaust flow path 29a (first exhaust minimum area Aa) is larger than the flow path cross-sectional area of the outer diameter side exhaust flow path 29b (second exhaust minimum area Ab). In other words, the flow path cross-sectional area of the outer diameter side exhaust flow path 29b (second exhaust minimum area Ab) is smaller than the flow path cross-sectional area of the inner diameter side exhaust flow path 29a (first exhaust minimum area Aa). As a result, as compared with the case where the flow path cross-sectional area of the outer diameter side exhaust flow path 29b (second exhaust minimum area Ab) is equal to the flow path cross-sectional area of the inner diameter side exhaust flow path 29a (first exhaust minimum area Aa), the turbine scroll flow path 33, and thus the turbine housing 5, can be downsized. As a result, the cost of the turbine housing 5 (turbocharger TC) can be reduced.

As described above, in the turbine housing 5 of the present embodiment, the flow path cross-sectional area of the inner diameter side bypass flow path 39a (inner diameter side bypass minimum area Ba) is smaller than the flow path cross-sectional area of the outer diameter side bypass flow path 39b (outer diameter side bypass minimum area Bb). In the turbine housing 5, the inner diameter side exhaust flow path 29a (first exhaust minimum area Aa) is larger than the outer diameter side exhaust flow path 29b (second exhaust minimum area Ab). That is, the inner diameter side bypass flow path 39a, whose flow path cross-sectional area is smaller than that of the outer diameter side bypass flow path 39b, is connected to the inner diameter side exhaust flow path 29a whose flow path cross-sectional area is larger than that of the outer diameter side exhaust flow path 29b.

Here, when the wastegate valve WV (see FIG. 1) is closed, exhaust gas flows through the exhaust flow path 29 without flowing through the bypass flow path 39. At this point, the exhaust gas flows through the exhaust flow path 29 at a flow rate corresponding to the flow path cross-sectional area of the inner diameter side exhaust flow path 29a and the outer diameter side exhaust flow path 29b. Therefore, a flow rate difference occurs between the inner diameter side flow rate and the outer diameter side flow rate when the wastegate valve WV is closed.

On the other hand, when the wastegate valve WV (see FIG. 1) is open, the exhaust gas flows through the exhaust flow path 29 and the bypass flow path 39. In this case, the exhaust gas flows through the exhaust flow path 29 and the bypass flow path 39 at flow rates corresponding to the flow path cross-sectional areas of the inner diameter side exhaust flow path 29a, the outer diameter side exhaust flow path 29b, the inner diameter side bypass flow path 39a, and the outer diameter side bypass flow path 39b. Here, the inner diameter side bypass flow path 39a, whose flow path cross-sectional area is smaller than that of the outer diameter side bypass flow path 39b, is connected to the inner diameter side exhaust flow path 29a whose flow path cross-sectional area is larger than that of the outer diameter side exhaust flow path 29b.

Therefore, the flow rate difference between the inner diameter side flow rate and the outer diameter side flow rate when the wastegate valve WV is open is smaller than the flow rate difference between the inner diameter side flow rate and the outer diameter side flow rate when the wastegate valve WV is closed. Therefore, the turbine housing 5 of the present embodiment can reduce the fluctuations in the engine back pressure when the wastegate valve WV is open and can suppress deterioration of the turbocharging performance of the turbocharger TC.

Here, the flow rate of the exhaust gas flowing through the inner diameter side exhaust flow path 29a when the wastegate valve WV (see FIG. 1) is closed is referred to as a closed-valve inner diameter side flow rate. The flow rate of the exhaust gas flowing through the inner diameter side exhaust flow path 29a and the inner diameter side bypass flow path 39a when the wastegate valve WV is open is referred to as an open-valve inner diameter side flow rate.

Similarly, the flow rate of the exhaust gas flowing through the outer diameter side exhaust flow path 29b when the wastegate valve WV (see FIG. 1) is closed is referred to as a closed-valve outer diameter side flow rate. The flow rate of the exhaust gas flowing through the outer diameter side exhaust flow path 29b and the outer diameter side bypass flow path 39b when the wastegate valve WV is open is referred to as an open-valve outer diameter side flow rate.

A flow rate difference between the open-valve inner diameter side flow rate and the open-valve outer diameter side flow rate is referred to as an open-valve flow rate difference. A flow rate difference between the closed-valve inner diameter side flow rate and the closed-valve outer diameter side flow rate is referred to as a closed-valve flow rate difference.

According to the present embodiment, in the turbine housing 5, the flow path cross-sectional area of the inner diameter side exhaust flow path 29a is relatively large as compared with the flow path cross-sectional area of the outer diameter side exhaust flow path 29b. In the turbine housing 5, the flow path cross-sectional area of the inner diameter side bypass flow path 39a is relatively small as compared with the flow path cross-sectional area of the outer diameter side bypass flow path 39b. Therefore, it is possible to make the open-valve flow rate difference smaller than the closed-valve flow rate difference. Therefore, the turbine housing 5 of the present embodiment can reduce the fluctuations in the engine back pressure when the wastegate valve WV is open and suppress deterioration of the turbocharging performance of the turbocharger TC.

In the above, the relationship between the first exhaust minimum area Aa and the second exhaust minimum area Ab and the inner diameter side bypass minimum area Ba and the outer diameter side bypass minimum area Bb has been described. Hereinafter, the relationship between the effective area when the exhaust gas passes through the turbine impeller 15 via the inner diameter side exhaust flow path 29a and the outer diameter side exhaust flow path 29b and the inner diameter side bypass minimum area Ba and the outer diameter side bypass minimum area Bb will be described in detail.

Here, the effective area when the exhaust gas passes through the turbine impeller 15 via the inner diameter side exhaust flow path 29a is defined as an inner diameter side effective area Aaf. The effective area when the exhaust gas passes through the turbine impeller 15 via the outer diameter side exhaust flow path 29b is defined as an outer diameter side effective area Abf. The details of the inner diameter side effective area Aaf and the outer diameter side effective area Abf will be described later.

Let Aa be the flow path cross-sectional area of the inner diameter side exhaust flow path 29a (in the present embodiment, the first exhaust minimum area Aa). Let Ab be the flow path cross-sectional area of the outer diameter side exhaust flow path 29b (in the present embodiment, the second exhaust minimum area Ab). Let Ba be the flow path cross-sectional area of the inner diameter side bypass flow path 39a (in the present embodiment, the inner diameter side bypass minimum area Ba). Let Bb be the flow path cross-sectional area of the outer diameter side bypass flow path 39b (in the present embodiment, the outer diameter side bypass minimum area Bb).

Let Ai be the total throat area of the turbine impeller 15. Let Aia be the throat area of a facing portion of the turbine impeller 15 that is facing the inner diameter side exhaust flow path 29a (hereinafter referred to as the inner diameter side throat area). Let Aib be the throat area of a facing portion of the turbine impeller 15 that is facing the outer diameter side exhaust flow path 29b (hereinafter referred to as the outer diameter side throat area). Details of the total throat area Ai, the inner diameter side throat area Aia, and the outer diameter side throat area Aib will be described later.

Let θa be the central angle of the facing portion of the turbine impeller 15 that is facing the inner diameter side exhaust flow path 29a (inner diameter side throat area Aia). Let θb be the central angle of the facing portion of the turbine impeller 15 that is facing the outer diameter side exhaust flow path 29b (outer diameter side throat area Aib). The details of the central angles θa and θb will be described later.

In this case, the inner diameter side effective area Aaf is derived by Equation (1) below.

[Math. 5]

$$A_{af} = \frac{A_a \cdot A_{ia}}{\sqrt{A_a^2 + A_{ia}^2}} \tag{1}$$

In Equation (1), the inner diameter side throat area Aia is derived by the following Equation (1a).

[Math. 6]

$$A_{ia} = A_i \cdot \frac{\theta_a}{\theta_a + \theta_b} \tag{1a}$$

In Equation (1a), the total throat area Ai of the turbine impeller 15 is approximately derived by Equation (1b) below.

[Math. 7]

$$A_i = \frac{\pi}{4}(D_{4s}^2 - D_{4h}^2) \cos\left\{\tan^{-1}\left(\tan\beta_{4s} \frac{\sqrt{\frac{1}{2}(D_{4s}^2 + D_{4h}^2)}}{D_{4s}}\right)\right\} \tag{1b}$$

Figure 5:
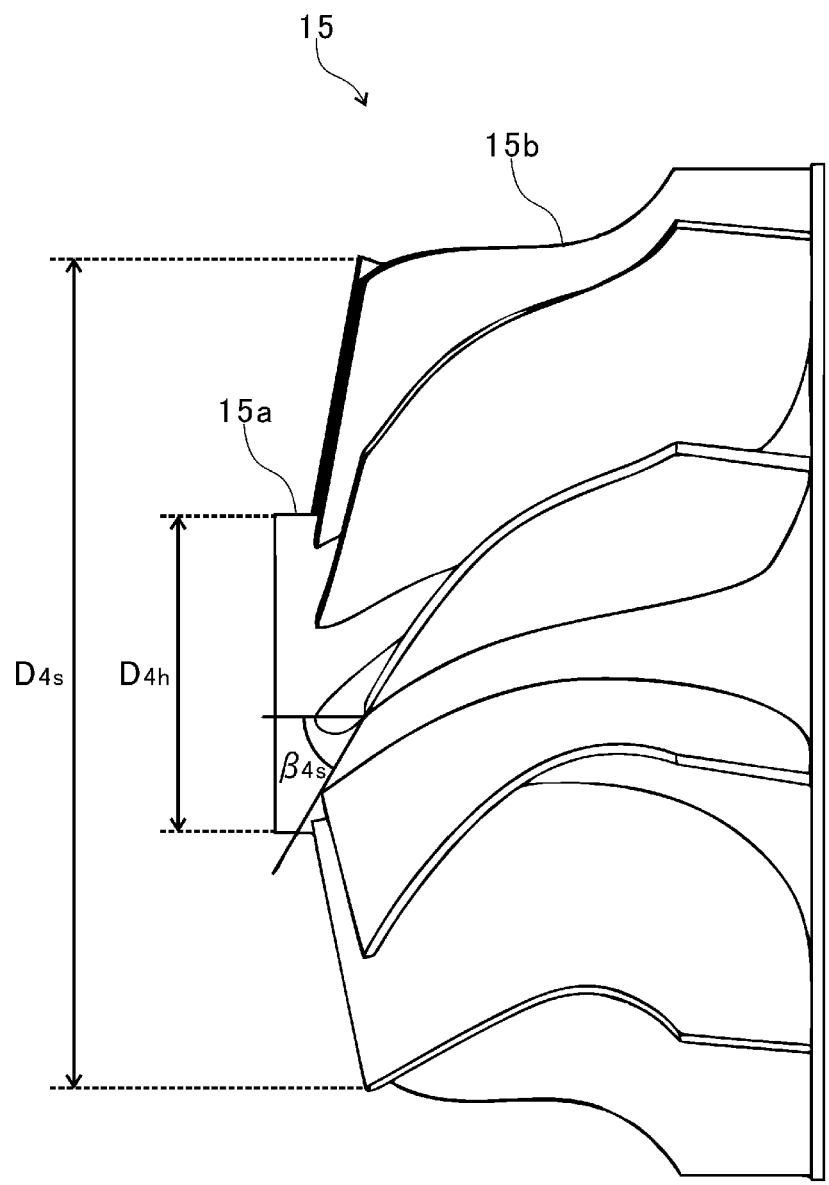
FIG. 5 is a diagram for explaining the total throat area of the turbine impeller.

FIG. 5 is a diagram for explaining the total throat area Ai of the turbine impeller 15. As illustrated in FIG. 5, the turbine impeller 15 has a hub 15a and blades 15b. The hub 15a is provided to the shaft 13 (see FIG. 1). The hub 15a has a shape in which the diameter becomes smaller as it extends toward the left side in FIG. 5 and becomes larger as it extends toward the right side in FIG. 5. The blades 15b are provided on the outer curved surface of the hub 15a. A plurality of blades 15b are provided while spaced apart from each other in the circumferential direction of the hub 15a. The outlet shroud diameter of the turbine impeller 15 is denoted by "D4s", and the outlet hub diameter of the turbine impeller 15 is denoted by "D4h". In addition, the blade angle on the outlet shroud side of the turbine impeller 15 is denoted by "β4s". Here, the total throat area Ai of the turbine impeller 15 is derived by the above Equation (1b).

Figure 6:
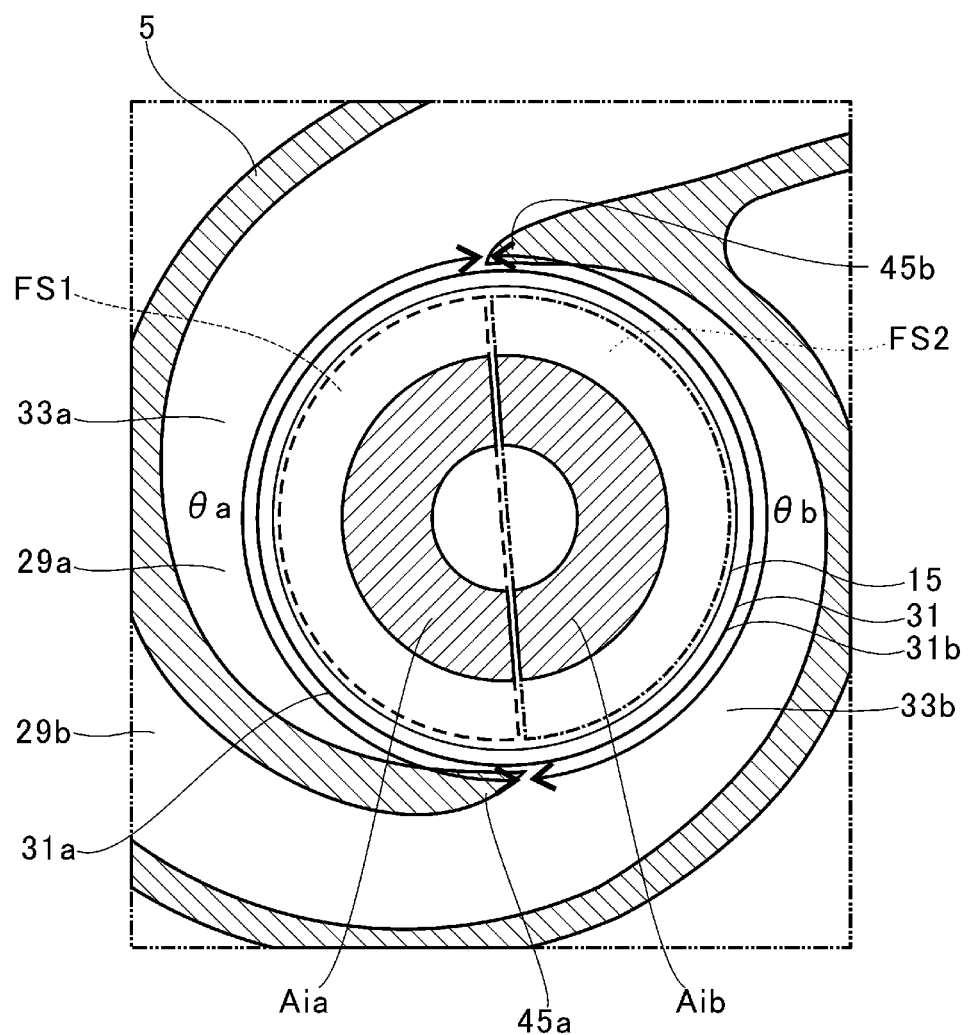
FIG. 6 is a diagram for explaining the inner diameter side throat area and the outer diameter side throat area of the turbine impeller.

FIG. 6 is a diagram for explaining the inner diameter side throat area Aia and the outer diameter side throat area Aib of the turbine impeller 15. As illustrated in FIG. 6, the turbine impeller 15 includes a facing portion FS1 that faces the inner diameter side exhaust flow path 29a. The inner diameter side throat area Aia is the throat area of the facing portion FS1 of the turbine impeller 15. The central angle θa is the central angle of the facing portion FS1 (inner diameter side throat area Aia) of the turbine impeller 15. Note that the central angle θa is approximately equal to the phase shift between the first tongue 45a and the second tongue 45b on the inner diameter side exhaust flow path 29a side.

The turbine impeller 15 includes a facing portion FS2 that faces the outer diameter side exhaust flow path 29b. The outer diameter side throat area Aib is the throat area of the facing portion FS2 of the turbine impeller 15. The central angle θb is the central angle of the facing portion FS2 (outer diameter side throat area Aib) of the turbine impeller 15. Note that the central angle θb is approximately equal to the phase shift between the first tongue 45a and the second tongue 45b on the outer diameter side exhaust flow path 29b side. In this embodiment, the central angle θa is approximately equal to the central angle θb.

The outer diameter side effective area Abf is derived by Equation (2) below.

[Math. 8]

$$A_{bf} = \frac{A_b \cdot A_{ib}}{\sqrt{A_b^2 + A_{ib}^2}} \quad (2)$$

In Equation (2), the outer diameter side throat area Aib is derived by Equation (2a) below.

[Math. 9]

$$A_{ib} = A_i \cdot \frac{\theta_b}{\theta_a + \theta_b} \quad (2a)$$

As illustrated in the above Equation (1), the inner diameter side effective area (first effective area) Aaf is derived from the flow path cross-sectional area of the inner diameter side exhaust flow path 29a (first exhaust minimum area Aa) and the throat area of the turbine impeller 15 (inner diameter side throat area Aia). As illustrated in the above Equation (2), the outer diameter side effective area (second effective area) Abf is derived from the flow path cross-sectional area of the outer diameter side exhaust flow path 29b (second exhaust minimum area Ab) and the throat area of the turbine impeller 15 (outer diameter side throat area Aib).

In the present embodiment, the difference between the inner diameter side effective area Aaf and the outer diameter side effective area Abf is larger than the difference between the sum of the inner diameter side effective area Aaf and the inner diameter side bypass minimum area Ba and the sum of the outer diameter side effective area Abf and the outer diameter side bypass minimum area Bb. That is, the difference between the sum of the inner diameter side effective area Aaf and the inner diameter side bypass minimum area Ba and the sum of the outer diameter side effective area Abf and the outer diameter side bypass minimum area Bb is smaller as compared to the difference between the inner diameter side effective area Aaf and the outer diameter side effective area Abf. The difference between the inner diameter side effective area Aaf and the outer diameter side effective area Abf satisfies the condition of Equation 3 below.

[Math. 10]

$$|(Aaf+Ba)-(Abf+Bb)| < |Aaf-Abf| \quad (3)$$

Here, the flow rate of the exhaust gas flowing through the inner diameter side exhaust flow path 29a (closed-valve inner diameter side flow rate) is derived from the inner diameter side effective area Aaf when the wastegate valve WV (see FIG. 1) is closed. The flow rate of the exhaust gas flowing through the inner diameter side exhaust flow path 29a and the inner diameter side bypass flow path 39a (open-valve inner diameter side flow rate) is derived from the inner diameter side effective area Aaf and the inner diameter side bypass minimum area Ba when the wastegate valve WV is open.

Similarly, the flow rate of the exhaust gas flowing through the outer diameter side exhaust flow path 29b (closed-valve outer diameter side flow rate) is derived from the outer diameter side effective area Abf when the wastegate valve WV (see FIG. 1) is closed. The flow rate of the exhaust gas flowing through the outer diameter side exhaust flow path 29b and the outer diameter side bypass flow path 39b (open-valve outer diameter side flow rate) is derived from the outer diameter side effective area Abf and the outer diameter side bypass minimum area Bb when the wastegate valve WV is open.

Therefore, it can be said that the left side of the above Equation 3 represents a value that corresponds to the flow rate difference (open-valve flow rate difference) between the open-valve inner diameter side flow rate and the open-valve outer diameter side flow rate. It can be said that the right side of the above Equation 3 represents a value that corresponds to the flow rate difference (closed-valve flow rate difference) between the closed-valve inner diameter side flow rate and the closed-valve outer diameter side flow rate. Therefore, the above Equation 3 represents the condition for the open-valve flow rate difference to be smaller than the closed-valve flow rate difference.

For example, the flow path cross-sectional areas of the inner diameter side bypass flow path 139a (see FIG. 4) of the comparative example and the outer diameter side bypass flow path 139b (see FIG. 4) are substantially the same. That is, the inner diameter side bypass minimum area Ba is substantially the same as the outer diameter side bypass minimum area Bb. Here, the left side of the above Equation 3 is equal to the right side. Therefore, the open-valve flow rate difference is not substantially different from the closed-valve flow rate difference. As described above, since the turbine housing 105 of the comparative example does not satisfy the condition of the above Equation 3, it is difficult to reduce the fluctuations in the engine back pressure while the wastegate valve WV is open.

On the other hand, the inner diameter side bypass minimum area Ba of the present embodiment is smaller than the outer diameter side bypass minimum area Bb. Here, the first exhaust minimum area Aa is larger than the second exhaust minimum area Ab. The inner diameter side throat area Aia and the outer diameter side throat area Aib are approximately equal. Therefore, the inner diameter side effective area Aaf is larger than the outer diameter side effective area Abf. Here, the left side of the above Equation 3 is smaller than the right side. Therefore, the open-valve flow rate difference is smaller than the closed-valve flow rate difference. As described above, since the turbine housing 5 of the present embodiment satisfies the condition of the above Equation 3, it is possible to reduce the fluctuations in the engine back pressure while the wastegate valve WV is open.

Note that there are cases where the left side of the above Equation 3 is larger than the right side in a case where the inner diameter side bypass minimum area Ba is smaller than the outer diameter side bypass minimum area Bb. In this case, the open-valve flow rate difference is larger than the closed-valve flow rate difference. In such a case, the fluctuations in the engine back pressure may disadvantageously increase when the wastegate valve WV is opened from a closed state. Therefore, in the turbine housing 5 of the present embodiment, it is preferable to set the flow path cross-sectional areas so as to satisfy the condition of the above Equation 3.

As described above, since the turbine housing 5 of the present embodiment satisfies the condition of the above Equation 3, it is possible to surely reduce the fluctuations in the engine back pressure while the wastegate valve WV is open.

Although the embodiment of the present disclosure has been described by referring to the accompanying drawings, it is naturally understood that the present disclosure is not limited to the above embodiment. It is clear that those skilled in the art can conceive various modifications or variations within the scope described in the claims, and it is understood that they are naturally also within the technical scope of the present disclosure.

For example, in the above embodiment, the example in which the turbine T is incorporated in the turbocharger TC has been described. However, the present disclosure is not limited to this, and the turbine T may be incorporated in a device other than the turbocharger TC or may be a separate body.

In the above embodiment, the example in which the first exhaust minimum area Aa is larger than the second exhaust minimum area Ab has been described. However, the present disclosure is not limited to this, and the first exhaust minimum area Aa may be smaller than the second exhaust minimum area Ab.

Figure 7:
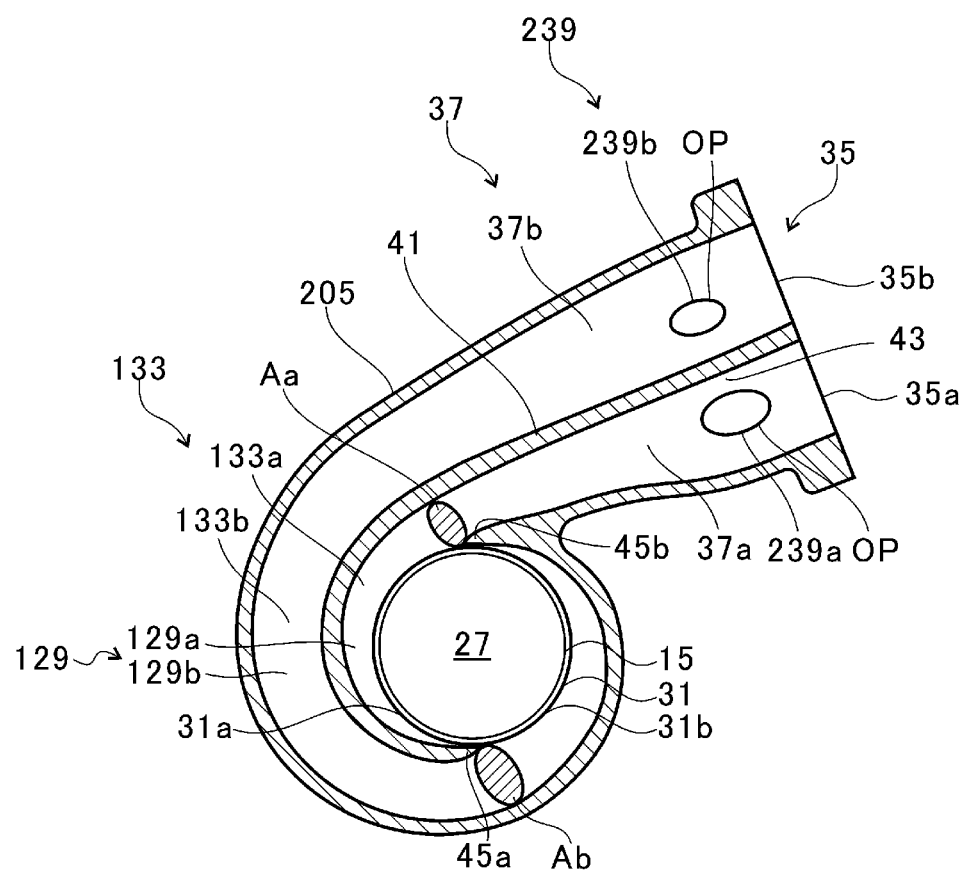
FIG. 7 is a cross-sectional view taken along line AA of a turbine housing of a modification.

FIG. 7 is a cross-sectional view taken along line AA of a turbine housing 205 of a modification. As illustrated in FIG. 7, the turbine housing 205 includes an exhaust flow path 129 and a bypass flow path 239. The exhaust flow path 129 includes an inner diameter side exhaust flow path 129a and an outer diameter side exhaust flow path 129b. The inner diameter side exhaust flow path 129a includes an inner diameter side turbine scroll flow path 133a. The outer diameter side exhaust flow path 129b includes an outer diameter side turbine scroll flow path 133b. The turbine housing 205 in the modification has the same structure as that of the turbine housing 5 in the above embodiment except for the inner diameter side turbine scroll flow path 133a, the outer diameter side turbine scroll flow path 133b, and the bypass flow path 239.

Here, the outer diameter side turbine scroll flow path 133b has a longer flow path length than that of the inner diameter side turbine scroll flow path 133a. That is, the outer diameter side exhaust flow path 129b has a longer flow path length than that of the inner diameter side exhaust flow path 129a. In this case, the outer diameter side exhaust flow path 129b has a larger pressure loss than that of the inner diameter side exhaust flow path 129a. Therefore, it is preferable that the outer diameter side exhaust flow path 129b has a larger flow path cross-sectional area than that of the inner diameter side exhaust flow path 129a.

Therefore, in the turbine housing 205 of the modification, the flow path cross-sectional area of the outer diameter side exhaust flow path (first exhaust flow path) 129b is larger than the flow path cross-sectional area of the inner diameter side exhaust flow path (second exhaust flow path) 129a. That is, the second exhaust minimum area Ab is larger than the first exhaust minimum area Aa. As described above, the flow path cross-sectional area of the one that has a longer flow path length among the inner diameter side exhaust flow path 129a and the outer diameter side exhaust flow path 129b may have a larger flow path cross-sectional area than the one that has a shorter flow path length among the inner diameter side exhaust flow path 129a and the outer diameter side exhaust flow path 129b. As a result, it is possible to reduce the pressure loss of the one that has a longer flow path length among the inner diameter side exhaust flow path 129a and the outer diameter side exhaust flow path 129b.

The bypass flow path 239 of the modification has an inner diameter side bypass flow path 239a and an outer diameter side bypass flow path 239b. The flow path cross-sectional area of the inner diameter side bypass flow path (second bypass flow path) 239a is larger than the flow path cross-sectional area of the outer diameter side bypass flow path (first bypass flow path) 239b. Specifically, an inner diameter side bypass minimum area Ba, which is the smallest flow path cross-sectional area of the inner diameter side bypass flow path 239a, is larger than an outer diameter side bypass minimum area Bb, which is the smallest flow path cross-sectional area of the outer diameter side bypass flow path 239b. That is, in the turbine housing 205, the flow path cross-sectional area of the outer diameter side exhaust flow path 129b is relatively larger as compared with the flow path cross-sectional area of the inner diameter side exhaust flow path 129a. In the turbine housing 205, the flow path cross-sectional area of the outer diameter side bypass flow path 239b is relatively smaller as compared with the flow path cross-sectional area of the inner diameter side bypass flow path 239a. Note that the flow path cross-sectional area of each of the exhaust flow path 129 and the bypass flow path 239 may be set so as to satisfy the condition of the above Equation 3. As a result, the turbine housing 205 of the modification can obtain similar effects to those of the above embodiment.

What is claimed is:

1. A turbine comprising:
   a housing in which an accommodation unit for accommodating a turbine impeller is formed;
   a first exhaust flow path formed in the housing and communicating with the accommodation unit;
   a second exhaust flow path formed in the housing and communicating with the accommodation unit at a position that is circumferentially different from a position where the accommodation unit and the first exhaust flow path communicate with each other, the second exhaust flow path having a flow path cross-sectional area smaller than a flow path cross-sectional area of the first exhaust flow path, a length of the second exhaust flow path being different from a length of the first exhaust flow path;
   a discharge flow path formed in the housing and communicating with the accommodation unit in an axial direction of the turbine impeller;
   a first bypass flow path connecting the first exhaust flow path and the discharge flow path; and
   a second bypass flow path connecting the second exhaust flow path and the discharge flow path, the second bypass flow path having a flow path cross-sectional area larger than a flow path cross-sectional area of the first bypass flow path,
   wherein the length of the second exhaust flow path is longer than the length of the first exhaust flow path.

2. The turbine according to claim 1, further comprising:
   a first tongue partitioning the first exhaust flow path and the second exhaust flow path, the first tongue included at a position facing a downstream end of the first exhaust flow path in the housing; and
   a second tongue partitioning the second exhaust flow path and the first exhaust flow path, the second tongue included at a position facing a downstream end of the second exhaust flow path in the housing,
   wherein the flow path cross-sectional area of the first exhaust flow path is a first exhaust minimum area in which the flow path cross-sectional area is the smallest in a portion of the first exhaust flow path facing the second tongue,
   the flow path cross-sectional area of the second exhaust flow path is a second exhaust minimum area in which the flow path cross-sectional area is the smallest in a portion of the second exhaust flow path facing the first tongue, the flow path cross-sectional area of the first bypass flow path is a first bypass minimum area in which the flow path cross-sectional area is the smallest in the first bypass flow path, the flow path cross-sectional area of the second bypass flow path is a second bypass minimum area in which the flow path cross-sectional area is the smallest in the second bypass flow path, and as compared with a difference between a first effective area, which is derived from the first exhaust minimum area and a throat area of the turbine impeller, and a second effective area, which is derived from the second exhaust minimum area and a throat area of the turbine impeller, a difference between a sum of the first effective area and the first bypass minimum area and a sum of the second effective area and the second bypass minimum area is smaller.

3. The turbine according to claim 2, wherein, where the first exhaust minimum area is denoted by Aa, the second exhaust minimum area is denoted by Ab, a total throat area of the turbine impeller is denoted by Ai, a throat area of a facing portion of the turbine impeller facing the first exhaust flow path is denoted by Aia, a throat area of a facing portion of the turbine impeller facing the second exhaust flow path is denoted by Aib, a central angle of the facing portion of the turbine impeller facing the first exhaust flow path is denoted by θa, a central angle of the facing portion of the turbine impeller facing the second exhaust flow path is denoted by θb, the first effective area is denoted by Aaf, and the second effective area is denoted by Abf, the first effective area Aaf is derived from Equation (1) and Equation (1a), and the second effective area Abf is derived from Equation (2) and Equation (2a).

[Math. 1]
$$A_{af} = \frac{A_a \cdot A_{ia}}{\sqrt{A_a^2 + A_{ia}^2}} \quad (1)$$

[Math. 2]
$$A_{ia} = A_i \cdot \frac{\theta_a}{\theta_a + \theta_b} \quad (1a)$$

[Math. 3]
$$A_{bf} = \frac{A_b \cdot A_{ib}}{\sqrt{A_b^2 + A_{ib}^2}} \quad (2)$$

[Math. 4]
$$A_{ib} = A_i \cdot \frac{\theta_b}{\theta_a + \theta_b} \quad (2a)$$

4. A turbine comprising:

a housing in which an accommodation unit for accommodating a turbine impeller is formed;

a first exhaust flow path formed in the housing and communicating with the accommodation unit;

a second exhaust flow path formed in the housing and communicating with the accommodation unit at a position that is circumferentially different from a position where the accommodation unit and the first exhaust flow path communicate with each other, the second exhaust flow path having a flow path cross-sectional area smaller than a flow path cross-sectional area of the first exhaust flow path, a length of the second exhaust flow path being different from a length of the first exhaust flow path;

a discharge flow path formed in the housing and communicating with the accommodation unit in an axial direction of the turbine impeller;

a first bypass flow path connecting the first exhaust flow path and the discharge flow path; and a second bypass flow path connecting the second exhaust flow path and the discharge flow path, the second bypass flow path having a flow path cross-sectional area larger than a flow path cross-sectional area of the first bypass flow path, wherein the length of the first exhaust flow path is longer than the length of the second exhaust flow path.

5. The turbine according to claim 4, further comprising:

a first tongue partitioning the first exhaust flow path and the second exhaust flow path, the first tongue included at a position facing a downstream end of the first exhaust flow path in the housing; and a second tongue partitioning the second exhaust flow path and the first exhaust flow path, the second tongue included at a position facing a downstream end of the second exhaust flow path in the housing, wherein the flow path cross-sectional area of the first exhaust flow path is a first exhaust minimum area in which the flow path cross-sectional area is the smallest in a portion of the first exhaust flow path facing the second tongue, the flow path cross-sectional area of the second exhaust flow path is a second exhaust minimum area in which the flow path cross-sectional area is the smallest in a portion of the second exhaust flow path facing the first tongue, the flow path cross-sectional area of the first bypass flow path is a first bypass minimum area in which the flow path cross-sectional area is the smallest in the first bypass flow path, the flow path cross-sectional area of the second bypass flow path is a second bypass minimum area in which the flow path cross-sectional area is the smallest in the second bypass flow path, and as compared with a difference between a first effective area, which is derived from the first exhaust minimum area and a throat area of the turbine impeller, and a second effective area, which is derived from the second exhaust minimum area and a throat area of the turbine impeller, a difference between a sum of the first effective area and the first bypass minimum area and a sum of the second effective area and the second bypass minimum area is smaller.

6. The turbine according to claim 5, wherein, where the first exhaust minimum area is denoted by Aa, the second exhaust minimum area is denoted by Ab, a total throat area of the turbine impeller is denoted by Ai, a throat area of a facing portion of the turbine impeller facing the first exhaust flow path is denoted by Aia, a throat area of a facing portion of the turbine impeller facing the second exhaust flow path is denoted by Aib, a central angle of the facing portion of the turbine impeller facing the first exhaust flow path is denoted by θa, a central angle of the facing portion of the turbine impeller facing the second exhaust flow path is denoted by θb, the first effective area is denoted by Aaf, and the second effective area is denoted by Abf, the first effective area Aaf is derived from Equation (1)

and Equation (1a), and the second effective area Abf is derived from Equation (2) and Equation (2a).

[Math. 1]
$$A_{af} = \frac{A_a \cdot A_{ia}}{\sqrt{A_a^2 + A_{ia}^2}} \quad (1)$$

[Math. 2]
$$A_{ia} = A_i \cdot \frac{\theta_a}{\theta_a + \theta_b} \quad (1a)$$

[Math. 3]
$$A_{bf} = \frac{A_b \cdot A_{ib}}{\sqrt{A_b^2 + A_{ib}^2}} \quad (2)$$

[Math. 4]
$$A_{ib} = A_i \cdot \frac{\theta_b}{\theta_a + \theta_b} \quad (2a)$$

7. A turbine comprising:
a housing in which an accommodation unit for accommodating a turbine impeller is formed;
a first exhaust flow path formed in the housing and communicating with the accommodation unit
a second exhaust flow path formed in the housing and communicating with the accommodation unit at a position that is circumferentially different from a position where the accommodation unit and the first exhaust flow path communicate with each other, the second exhaust flow path having a flow path cross-sectional area smaller than a flow path cross-sectional area of the first exhaust flow path, a length of the second exhaust flow path being different from a length of the first exhaust flow path;
a discharge flow path formed in the housing and communicating with the accommodation unit in an axial direction of the turbine impeller;
a first bypass flow path connecting the first exhaust flow path and the discharge flow path;
a second bypass flow path connecting the second exhaust flow path and the discharge flow path, the second bypass flow path having a flow path cross-sectional area larger than a flow path cross-sectional area of the first bypass flow path;
a first tongue partitioning the first exhaust flow path and the second exhaust flow path, the first tongue included at a position facing a downstream end of the first exhaust flow path in the housing; and
a second tongue partitioning the second exhaust flow path and the first exhaust flow path, the second tongue included at a position facing a downstream end of the second exhaust flow path in the housing,
wherein the flow path cross-sectional area of the first exhaust flow path is a first exhaust minimum area in which the flow path cross-sectional area is the smallest in a portion of the first exhaust flow path facing the second tongue,
the flow path cross-sectional area of the second exhaust flow path is a second exhaust minimum area in which the flow path cross-sectional area is the smallest in a portion of the second exhaust flow path facing the first tongue,
the flow path cross-sectional area of the first bypass flow path is a first bypass minimum area in which the flow path cross-sectional area is the smallest in the first bypass flow path,
the flow path cross-sectional area of the second bypass flow path is a second bypass minimum area in which the flow path cross-sectional area is the smallest in the second bypass flow path, and
as compared with a difference between a first effective area, which is derived from the first exhaust minimum area and a throat area of the turbine impeller, and a second effective area, which is derived from the second exhaust minimum area and a throat area of the turbine impeller, a difference between a sum of the first effective area and the first bypass minimum area and a sum of the second effective area and the second bypass minimum area is smaller.

8. The turbine according to claim 7,
wherein, where the first exhaust minimum area is denoted by Aa, the second exhaust minimum area is denoted by Ab, a total throat area of the turbine impeller is denoted by Ai, a throat area of a facing portion of the turbine impeller facing the first exhaust flow path is denoted by Aia, a throat area of a facing portion of the turbine impeller facing the second exhaust flow path is denoted by Aib, a central angle of the facing portion of the turbine impeller facing the first exhaust flow path is denoted by θa, a central angle of the facing portion of the turbine impeller facing the second exhaust flow path is denoted by θb, the first effective area is denoted by Aaf, and the second effective area is denoted by Abf, the first effective area Aaf is derived from Equation (1) and Equation (1a), and the second effective area Abf is derived from Equation (2) and Equation (2a).

[Math. 1]
$$A_{af} = \frac{A_a \cdot A_{ia}}{\sqrt{A_a^2 + A_{ia}^2}} \quad (1)$$

[Math. 2]
$$A_{ia} = A_i \cdot \frac{\theta_a}{\theta_a + \theta_b} \quad (1a)$$

[Math. 3]
$$A_{bf} = \frac{A_b \cdot A_{ib}}{\sqrt{A_b^2 + A_{ib}^2}} \quad (2)$$

[Math. 4]
$$A_{ib} = A_i \cdot \frac{\theta_b}{\theta_a + \theta_b} \quad (2a)$$

* * * * *